US010280320B2

(12) United States Patent
Romanato et al.

(10) Patent No.: US 10,280,320 B2
(45) Date of Patent: May 7, 2019

(54) LAMINATION PRINTING INK COMPRISING AN AQUEOUS DISPERSION COMPRISING POLYURETHANE

(71) Applicant: BASF SE, Ludwigshafen (DE)

(72) Inventors: Paola Romanato, Muttenz (CH); Karl Haeberle, Speyer (DE); Arjan Thomas Termaten, Assen (NL); Steven Zijlstra, Zwolle (NL); Wouter Toutenhoofd, Heerenveen (NL)

(73) Assignee: BASF SE, Ludwigshafen (DE)

( * ) Notice: Subject to any disclaimer, the term of this patent is extended or adjusted under 35 U.S.C. 154(b) by 129 days.

(21) Appl. No.: 15/110,246

(22) PCT Filed: Jan. 14, 2015

(86) PCT No.: PCT/EP2015/050590
§ 371 (c)(1),
(2) Date: Jul. 7, 2016

(87) PCT Pub. No.: WO2015/107078
PCT Pub. Date: Jul. 23, 2015

(65) Prior Publication Data
US 2016/0326389 A1    Nov. 10, 2016

(30) Foreign Application Priority Data

Jan. 17, 2014   (EP) .................................... 14151664

(51) Int. Cl.
| | |
|---|---|
| *B29C 65/48* | (2006.01) |
| *B29C 65/72* | (2006.01) |
| *C08G 18/08* | (2006.01) |
| *C08G 18/28* | (2006.01) |
| *C08G 18/38* | (2006.01) |
| *C08G 18/40* | (2006.01) |
| *C08G 18/42* | (2006.01) |
| *C08G 18/48* | (2006.01) |
| *C08G 18/65* | (2006.01) |
| *C08G 18/66* | (2006.01) |
| *C09D 11/037* | (2014.01) |
| *C09D 11/102* | (2014.01) |
| *C08G 18/72* | (2006.01) |
| *C08G 18/75* | (2006.01) |

(52) U.S. Cl.
CPC ............ *C09D 11/102* (2013.01); *B29C 65/48* (2013.01); *B29C 65/72* (2013.01); *C08G 18/0823* (2013.01); *C08G 18/283* (2013.01); *C08G 18/3821* (2013.01); *C08G 18/4018* (2013.01); *C08G 18/4238* (2013.01); *C08G 18/48* (2013.01); *C08G 18/4854* (2013.01); *C08G 18/6511* (2013.01); *C08G 18/6685* (2013.01); *C08G 18/722* (2013.01); *C08G 18/755* (2013.01); *C08G 18/758* (2013.01); *C09D 11/037* (2013.01)

(58) Field of Classification Search
CPC .......................... C09D 11/102; C09D 11/037; C08G 18/4854; C08G 18/6685; C08G 18/722; C08G 18/755; C08G 18/758; C08G 18/0823; C08G 18/283; C08G 18/3821; C08G 18/4018; C08G 18/4238; C08G 18/48; B29C 65/48; B29C 65/72
See application file for complete search history.

(56) References Cited

U.S. PATENT DOCUMENTS

| | | | |
|---|---|---|---|
| 4,192,937 A | 3/1980 | Noll et al. | |
| 2005/0043467 A1 | 2/2005 | Bruchmann et al. | |
| 2007/0203289 A1* | 8/2007 | Bruchmann | C08G 18/0828 524/589 |
| 2010/0010113 A1 | 1/2010 | Schwalm et al. | |
| 2010/0065209 A1 | 3/2010 | Burghardt et al. | |

FOREIGN PATENT DOCUMENTS

| | | |
|---|---|---|
| JP | 4-178418 A | 6/1992 |
| JP | 8-60063 A | 3/1996 |
| JP | 2013-234214 A | 11/2013 |
| WO | WO 2009/023520 A1 | 2/2009 |

OTHER PUBLICATIONS

International Search Report dated Mar. 30, 2015 in PCT/EP2015/050590.
International Preliminary Report on Patentability and Written Opinion of the International Searching Authority dated Jul. 19, 2016 in PCT/EP2015/050590 filed Jan. 14, 2015 (submitting English translation).

* cited by examiner

*Primary Examiner* — Patrick D Niland
(74) *Attorney, Agent, or Firm* — Oblon, McClelland, Maier & Neustadt, L.L.P.

(57) ABSTRACT

The present invention relates to a lamination printing ink comprising an aqueous polyurethane dispersion binder, pigments, an aqueous carrier and optional additives, wherein the polyurethane is made of polyisocyanates, specific polyesterdiols, polytetrahydrofuran diol, monohydroxy-poly(alkylene oxide), diamino acid compound, polyamine compound and optionally one or more low molecular weight polyols.

20 Claims, No Drawings

LAMINATION PRINTING INK COMPRISING AN AQUEOUS DISPERSION COMPRISING POLYURETHANE

The present invention relates to a lamination printing ink comprising an aqueous polyurethane dispersion binder, pigments, an aqueous carrier and optional additives, wherein the polyurethane is made of polyisocyanates, specific polyesterdiols, polytetrahydrofuran diol, monohydroxy-poly(alkylene oxide), diamino acid compound, polyamine compound and optionally one or more low molecular weight polyols. The invention also relates to laminates printed with said ink and methods of making said laminates.

Packagings such as packagings for food often comprise printed film laminates made of two or more polymeric films which are laminated together and wherein the printing ink resides between two laminated films. Typically, when preparing packaging intended to be used to package food products, a film is printed on one side, adhesive is applied on top of the printing as well as on the clear areas surrounding the printing, and then the film is laminated to a second film at a laminating nip. In in-line printing, the adhesive is coated on top of the freshly printed ink or the opposite web and immediately thereafter is laminated. In many cases, lamination is accomplished "out of line," meaning that a printed roll is taken to another location for lamination. The adhesive must bond to the ink as well as to the film without causing the ink to bleed, run, delaminate, or generate poor bond strength.

Printing inks which are suitable for making printed laminates via roll printing process (hereinafter referred to as "lamination inks") face a variety of desired requirements:
high compatibility with pigments in the liquid ink
blocking behavior of the printed film as low as possible
high lamination bond strength of the film laminates, also in case of multiple printing
high re-solubility of ink which has temporarily dried on the printing rolls
no volatile bases Especially, a coagulation or flocculation of ink ingredients should be avoided. In cases, where lamination is accomplished "out of line" it is important that a printed film is blocking resistant before lamination, i.e. that the printed surface of the film is not sticky and does not adhere to other printed or non-printed film surface areas.

High lamination bond strength is especially critical and difficult to achieve in multiple print laminate wherein a second print or further prints are applied on a first print, e.g. a white print is applied on top of a previous colored, non-white print.

Intended or unintended interruptions can occur during the roll printing process. The ink on the printing roll cylinders can become touch dry during these interruptions. Therefore, it is important that the dried ink on the printing equipment re-dissolves quickly in the liquid printing ink stock when the printing process is resumed.

For hygiene reasons it is desired to provide printing inks with no ammonia and no volatile organic tertiary amines.

WO 2009/023520 discloses lamination inks comprising aqueous polyurethane binders with good lamination bond strength on various substrates.

It is an object of the invention to further optimize lamination printing inks in respect to one or more of the above-mentioned requirements, especially concerning improved blocking resistance and improved re-solubility behaviour without undue impairing one or more of the other desired requirements.

The invention provides a lamination printing ink comprising at least one binder, at least one pigment, an aqueous carrier and optional additives, wherein at least one binder is an aqueous dispersion comprising a polyurethane, wherein the polyurethane is made of components comprising
  a) at least one polyisocyanate with at least two isocyanate groups,
  b) a combination of diols wherein
    b1) at least one of the diols is a polyesterdiol having a number average molecular weight of from 500 to 5000 g/mol, preferably from about 1000 to 3000 g/mol and
    b2) at least one of the diols is polytetrahydrofuran having a number average molecular weight of from 500 to 5000 g/mol, preferably from about 1000 to 3000 g/mol,
  c) at least one monohydroxy-poly(alkylene oxide) compound having a number average molecular weight of from 500 to 5000 g/mol, preferably from about 1000 to 3000 g/mol,
  d) at least one diamino acid compound,
  e) at least one polyamine compound having at least two amino groups and no acid group, and
  f) optionally one or more polyol compounds having a number average molecular weight of less than 500 g/mol, preferably from 60 to 490 g/mol.

Preferably, the polyurethane is made of components comprising
  a) 5 to 30% by weight of the at least one polyisocyanate with at least two isocyanate groups,
  b) 10 to 80% by weight of the combination of diols wherein polyesterdiols (b1) and polytetrahydrofuran diol (b2) are preferably in a weight ratio of from 1:2 to 2:1,
  c) 1 to 20% by weight of the at least one monohydroxy-poly(alkylene oxide) compound having a number average molecular weight of from 500 to 5000 g/mol
  d) 1 to 10% by weight of the at least one diamino acid compound,
  e) 0,1 to 10% by weight at least one polyamine compound having at least two amino groups and no acid group, and
  f) 0 to 10% by weight of the optional one or more polyol compounds having a number average molecular weight of less than 500 g/mol, preferably from 60 to 490 g/mol.

The polyisocyanates (a) are preferably used in amounts of 5 to 30% by weight, more preferred from 10 to 25% by weight. The polyisocyanates (a) are, in particular, diisocyanates $X(NCO)_2$, where X is an aliphatic hydrocarbon radical of 4 to 12 carbons, a cycloaliphatic hydrocarbon radical of 6 to 15 carbons or an aromatic hydrocarbon radical of 6 to 15 carbons or an araliphatic hydrocarbon radical of 7 to 15 carbons. Examples of such diisocyanates are tetramethylene diisocyanate, hexamethylene diisocyanate (HDI), dodecamethylene diisocyanate, 1,4-diisocyanatocyclohexane, 1-isocyanato-3,5,5-trimethyl-5-isocyanatomethylcyclohexane (IPDI), 2,2-bis(4-isocyanatocyclohexyl)propane, trimethylhexane diisocyanate, 1,4-diisocyanatobenzene, 2,4-diisocyanatotoluene, 2,6-diisocyanatotoluene, 4,4'-diisocyanatodiphenylmethane, 2,4'-diisocyanatodiphenylmethane, p-xylylene diisocyanate, tetramethylxylylene diisocyanate (TMXDI), the isomers of bis(4-isocyanatocyclohexyl)methane (HMDI, such as the trans/trans, the cis/cis and the cis/trans isomer), and mixtures of these compounds. Particularly important mixtures of these isocyanates are the mixtures of the respective structural isomers of diisocyanatotoluene and diisocyanatodiphenylmethane, especially the mixture comprising 80 mol % 2,4-diisocyanatotoluene and 20 mol % 2,6-diisocyanatotoluene. In addition, the mixtures of aromatic isocyanates, such as 2,4-diisocyanatotoluene and/or 2,6-diisocyanatotoluene, with aliphatic or cycloaliphatic isocyanates, such as hexamethylene diisocyanate or IPDI, are particularly advantageous, the preferred proportion of aliphatic to aromatic isocyanates being from 4:1 to 1:4. In addition to the above mentioned isocyanates, other isocyanates which can be employed as compounds to synthesize the polyurethanes are those which carry not only the free isocyanate groups but also further, blocked isocyanate groups, examples being uretdione groups. Especially preferred are polyisocyanates (a) selected from the group consisting of 1-isocyanato-3,5,5-trimethyl-5-isocyanatomethylcyclohexane (IPDI), tetramethylxylylene diisocyanate (TMXDI), hexamethylene diisocyanate (HDI), bis(4-isocyanatocyclohexyl)-methane (HMDI) or mixtures thereof.

The combination of diols (b) is preferably used in amounts of 10 to 80% by weight, more preferred from 20 to 70% by weight. The weight ratio of polyesterdiols (b1) and polytetrahydrofuran diol (b2) is preferably from 1:3 to 3:1 more preferably from 1:2 to 2:1. The polyesterdiols (b1) are, in particular, polyesterpolyols which are known, for example, from Ullmann's Encyklopädie der technischen Chemie, 4th Edition, Vol. 19, pp. 62 to 65. It is preferred to employ polyesterpolyols that are obtained by reacting dihydric alcohols with dibasic carboxylic acids. Instead of the free polycarboxylic acids it is also possible to use the corresponding polycarboxylic anhydrides or corresponding polycarboxylic esters of lower alcohols, or mixtures thereof, to prepare the polyesterpolyols. The polycarboxylic acids can be aliphatic, cycloaliphatic, araliphatic, aromatic or heterocyclic and can be unsubstituted or substituted (by halogen atoms, for example), and/or saturated or unsaturated. Examples are suberic, azelaic, phthalic and isophthalic acid, phthalic, tetrahydrophthalic, hexahydrophthalic, tetrachlorophthalic, endomethylenetetrahydrophthalic, glutaric and maleic anhydride, maleic acid, fumaric acid and dimeric fatty acids. Preference is given to dicarboxylic acids of the formula HOOC—$(CH_2)_y$-COOH, where y is a number from 1 to 20, preferably an even number from 2 to 20, examples being succinic, adipic, sebacic and dodecanedicarboxylic acids.

Examples of suitable polyhydric alcohols for making the polyesterdiols (b1) are ethylene glycol, 1,2-propanediol, 1,3-propanediol, 1,3-butanediol, 1,4-butanediol, 1,4-butenediol, 1,4-butynediol, 1,5-pentanediol, neopentyl glycol, bis(hydroxymethyl)cyclohexanes such as 1,4-bis(hydroxymethyl)cyclohexane, 2-methyl-1,3-propanediol, methylpentanediols, and also diethylene glycol, triethylene glycol, tetraethylene glycol, polyethylene glycol, dipropylene glycol, polypropylene glycol, dibutylene glycol and polybutylene glycols. Preference is given to alcohols of the formula HO—$(CH_2)_x$-OH, where x is a number from 1 to 20, preferably an even number from 2 to 20. Examples of such alcohols are ethylene glycol, 1,4-butanediol, 1,6-hexanediol, 1,8-octanediol and 1,12-dodecanediol. Preference extends to neopentyl glycol.

Also suitable are polycarbonatediols, as can be obtained, for example, by reaction of phosgene with an excess of the low molecular mass alcohols cited above as structural components for the polyesterpolyols. Lactone-based polyesterdiols are also suitable, these being homopolymers or copolymers of lactones, preferably hydroxy-terminal adducts of lactones with suitable difunctional starter molecules. Suitable lactones are preferably those derived from compounds of the formula HO—$(CH_2)_z$-COOH, where z is from 1 to 20 and one hydrogen of a methylene unit can also be substituted by a C1-C4-alkyl. Examples are [epsilon]-caprolactone, [beta]-propiolactone, [gamma]-butyrolactone and/or methyl-[epsilon]-caprolactone, and mixtures thereof. Examples of suitable starter components are the low molecular mass dihydric alcohols cited above as structural components for the polyesterpolyols. The corresponding polymers of [epsilon]-caprolactone are particularly preferred. Lower polyesterdiols or polyetherdiols can also be employed as starters for preparing the lactone polymers. Instead of the polymers of lactones it is also possible to employ the corresponding, chemically equivalent polycondensates of the hydroxycarboxylic acids which correspond to the lactones.

Polytetrahydrofuran diol (b2) is obtainable in particular by addition polymerization of tetrahydrofuran with itself, in the presence, for example, of BF3, or by addition reaction onto starter components containing reactive hydrogens, such as alcohols or amines, examples being water, ethylene glycol, 1,2-propanediol, 1,3-propanediol, 1,2-bis(4-hydroxydiphenyl)propane or aniline. Particular preference is given to polytetrahydrofuran having a number average molecular weight of from 500 to 5000 and, in particular, from 500 to 4500 or from 1000 to 3000 g/mol.

The at least one monohydroxy-poly(alkylene oxide) compound (c) is preferably used in amounts of 1 to 20% by weight, more preferably in amounts of from 2 to 10% by weight. Suitable compounds (c) are alkanol started polyalkylene glycols. These compounds have an alkyl group at one terminal end and a hydroxy group at the other terminal end of the polymer. The alkanol has preferably 2 to 8 or 2 to 5 carbon atoms such as ethanol, propanol or butanol, preferably n-butanol. The alkylene group is for example ethylene, propylene or a mixture thereof, preferably ethylene. The general formula can be HO-$(A-O)_n$—R with A being an alkylene group as mentioned above, R being an alkyl group as mentioned above and n being a number from 20 to 65. The OH-number of the monohydroxy-poly(alkylene oxide) compound (c) is preferably from 20 to 56 mg KOH/g.

The at least one diamino acid compound (d) is preferably used in amounts of 1 to 10% by weight, more preferably in amounts of from 1 to 5% by weight. Suitable diamino acid compounds can be selected from the group consisting of diamino carboxylic acid compounds and diamino sulfonic acid compounds. Such compounds conform for example to the formula H2N—R1-NH—R2-X where R1 and R2 independently of one another are a C1-C6-alkanediyl, preferably ethylene, and X is COOH or SO3H. Particularly preferred compounds (d) are N-(2-aminoethyl)-2-aminoethane carboxylic acid and N-(2-aminoethyl)-2-aminoethane sulfonic acid and the corresponding alkali metal salts, Na being the particularly preferred counterion.

The at least one polyamine compound (e) having at least two amino groups and no acid group is preferably used in amounts of 0.1 to 10% by weight, more preferably in amounts of from 0.1 to 2% by weight. The polyamine compounds (e) can serve generally for crosslinking or chain extension and typically have 2 or more primary and/or secondary amino groups. Polyamines having 2 or more primary and/or secondary amino groups are employed in particular when chain extension and/or crosslinking is to take place in the presence of water, since amines generally react more quickly with isocyanates than do alcohols or water. This is in many cases necessary when the desire is for aqueous dispersions of crosslinked polyurethanes, or polyurethanes of high molar weight. In such cases a procedure is followed in which prepolymers with isocyanate groups are prepared, are rapidly dispersed in water and then are subjected to chain extension or crosslinking by adding compounds having two or more isocyanate-reactive amino groups. Amines suitable for this purpose are, in general, polyfunctional amines with a molar weight in the range from 32 to 500 g/mol, preferably from 60 to 300 g/mol, having at least two amino groups selected from the group consisting of primary and secondary amino groups. Examples are diamines such as diaminoethane, diaminopropanes, diaminobutanes, diaminohexanes, piperazine, 2,5-dimethylpiperazine, amino-3-aminomethyl-3,5,5-trimethyl-cyclohexane (isophoronediamine, IPDA), 4,4'-diaminodicyclo-hexylmethane, 1,4-diaminocyclohexane, aminoethylethanolamine, hydrazine, hydrazine hydrate or triamines such as diethylenetriamine or 1,8-diamino-4-aminomethyloctane. It is preferred to use mixtures of diamines and triamines, especially mixtures of isophoronediamine (IPDA) and diethylenetriamine (DETA). The polyurethanes contain preferably from 1 to 30 mol %, especially from 4 to 25 mol %, based on the total amount of polyurethane components, of a polyamine having at least 2 isocyanate-reactive amino groups, as monomers (d). Preferably, the polyamine compound is selected from the group consisting of isophoronediamine, diethylenetriamine and mixtures thereof.

The amines can also be employed in blocked form, for example in the form of the corresponding ketimines, ketazines or amine salts. Oxazolidines too, as are used, for example, in U.S. Pat. No. 4,192,937, are capped polyamines which can be employed to chain extend the prepolymers in the preparation of the polyurethanes. When capped polyamines of this kind are used they are generally mixed with the prepolymers in the absence of water and this mixture is subsequently mixed with the dispersion water or with a portion thereof so that the corresponding polyamines are liberated by hydrolysis.

The hardness and the modulus of elasticity of the polyurethanes can be raised by employing low molecular mass polyols (f) (preferably diols) having a molecular weight of less than 500 g/mol, e.g. from about 60 to 490 g/mol, preferably from 62 to 200 g/mol. The amount of low molecular weight polyols (f) is preferably 0 to 10% by weight, more preferably from 1 to 8% by weight. Compounds employed as polyols (f) are in particular the structural components of the short-chain alkanediols cited for the preparation of polyesterdiols, preference being given to the diols having 2 to 12 carbons, to the unbranched diols having 2 to 12 carbons and an even number of carbons, and to 1,5-pentanediol, 1,4-butanediol and neopentyl glycol.

In one aspect of the invention, the polyurethane is made exclusively from components (a) to (e) or exclusively from components (a) to (f) as mentioned above.

Optionally, the polyurethane can be made from one or more additional compounds, different from components (a) to (f), with at least one isocyanate group or with at least one isocyanate-reactive group. Examples are alcohols having a functionality of more than 2 which can be used to establish a certain degree of branching or crosslinking, such as trimethylolpropane, glycerol and sugars. Also suitable are monoalcohols which in addition to the hydroxyl carry a further isocyanate-reactive group, such as monoalcohols having one or more primary and/or secondary amino groups; for example, monoethanolamine. For branching or crosslinking purposes it is also possible, to employ isocyanates with a functionality of more than two. Examples of commercial compounds are the isocyanurate or the biuret of hexamethylene diisocyanate.

Polyurethane binders having a particularly good profile of properties are obtained in particular when the monomers (a) employed comprise essentially only aliphatic diisocyanates, and/or cycloaliphatic diisocyanates; and when the monomer (b1) employed essentially comprises only polyesterdiols synthesized from the abovementioned aliphatic diols and diacids; and when component (d), comprises alkali metal salts of N-(2-aminoethyl)-2-aminoethane sulfonic acid and/or N-(2-aminoethyl)-2-aminoethane carboxylic acid; and when component (d) is a mixture of DETA/IPDA.

In the field of polyurethane chemistry it is generally known how the molecular weight of the polyurethanes can be adjusted by choosing the proportions of the co-reactive monomers and by the arithmetic mean of the number of reactive functional groups per molecule. The components and their respective molar amounts are normally chosen such that the ratio A:B, where A is the molar amount of isocyanate groups and B is the sum of the molar amount of the hydroxyls and the molar amount of the further functional groups which are able to react with isocyanates in an addition reaction, is from 0.5:1 to 2:1, preferably from 0.8:1 to 1.5:1 and, with particular preference, from 0.9:1 to 1.2:1. With very particular preference the ratio A:B is as close as possible to 1:1.

The components (a) to (f) employed carry on average usually from 1.5 to 2.5, preferably from 1.9 to 2.1 and, with particular preference, 2.0 isocyanate groups and/or functional groups which are able to react with isocyanates in an addition reaction.

Preferably, the polyurethane is made of components comprising
a) 5 to 30% by weight of at least one polyisocyanate with at least two isocyanate groups,
b) 10 to 80% by weight of a combination of diols wherein
  b1) at least one of the diols is a polyesterdiol having molecular weight of from 500 to 5000, and
  b2) at least one of the diols is polytetrahydrofuran having a number average molecular weight of from 500 to 5000 g/mol,
  wherein polyesterdiols (b1) and polytetrahydrofuran diol (b2) are preferably in a weight ratio of from 1:2 to 2:1,
c) 1 to 20% by weight of at least one monohydroxy-poly (alkylene oxide) compound having a number average molecular weight of from 500 to 5000 g/mol
d) 1 to 10% by weight of the at least one diamino acid compound,
e) 0,1 to 10% by weight at least one polyamine compound having at least two amino groups and no acid group, and
f) 0 to 10% by weight of the optional one or more polyol compounds having a number average molecular weight of less than 500 g/mol, preferably from 60 to 490 g/mol.

The polyaddition of the structural components for the production of the polyurethane preferably takes place at reaction temperatures of up to 180° C., with preference up to 150° C. preferably from 70 to 150° C. at atmospheric pressure or under autogenous pressure. The production of polyurethanes and of aqueous polyurethane dispersions is known to the person skilled in the art. The polyurethanes preferably take the form of aqueous dispersions and are used in this form. The pH of the polymer dispersion is preferably adjusted to be above 5, in particular to be between 5.5 and 9.5.

The PU dispersions are usually prepared by one of the following methods. In the acetone process an ionic polyurethane is prepared from the components in a water-miscible solvent which boils at below 100° C. under atmospheric pressure. Water is added until a dispersion is formed in which water is the coherent phase. The prepolymer mixing process differs from the acetone process in that rather than a fully reacted (potentially) ionic polyurethane it is a prepolymer carrying isocyanate groups which is prepared first. In this case, the components are chosen such that the above-defined ratio A:B is greater than 1.0 to 3, preferably 1.05 to 1.5. The prepolymer is first dispersed in water and then crosslinked, possibly by reacting the isocyanate groups with amines which carry more than 2 isocyanate-reactive amino groups, or is chain extended with amines which carry 2 isocyanate-reactive amino groups. Chain extension also takes place when no amine is added. In this case, isocyanate groups are hydrolyzed to amino groups, which react with residual isocyanate groups of the prepolymers and so extend the chain. If a solvent has been used in preparing the polyurethane, it is usual to remove the majority of the solvent from the dispersion, for example by distillation under reduced pressure. The dispersions preferably have a solvent content of less than 10% by weight and are, with particular preference, free from solvents. The dispersions generally have a solids content of from 10 to 75, preferably from 20 to 65% by weight and a viscosity of from 10 to 500 mPas (measured at 20° C. and at a shear rate of 250 s$^{-1}$).

In one aspect of the invention the lamination printing ink is free of ammonia and volatile organic tertiary amines. The term volatile means compounds with boiling points below 100° C.

The lamination ink preferably comprises 8 to 60% by weight, preferably 15 to 50% by weight of binder, 3 to 30% by weight, preferably 6 to 30% by weight of pigments, 15 to 60% by weight, preferably 30 to 60% by weight of water and 0,1 to 5% by weight of additives such as surfactants, antifoam agents, and waxes.

The binder can be exclusively the polyurethane binder of the invention. Combinations of polyurethane binders according to the invention with other polyurethane or non-polyurethane binder resins such as acrylics can also be employed. When other binder resins are used, they preferably do not exceed about 50% of the total amount of binder. The inks are preferably free of ammonia; volatile tertiary amines, residual isocyanate and tin.

The lamination printing ink of this invention may be used in either flexographic or gravure printing by simply making minor adjustments to the formulation concentrations. Thus, the component concentrations may be adjusted for use in flexography or gravure printing. For example, a gravure ink or a flexographic ink preferably comprises about 8 to 60 wt. % of the binder, about 3 to 30 wt. % of the pigment colorant and about 15 to 60 wt. % solvent or water. The ink preferably has a viscosity between about 15 seconds to 30 seconds, as measured in a #2 efflux cup. Efflux cup measurement is the conventional method for measuring ink viscosities and involves timing the flow of a calibrated quantity of ink through a calibrated orifice. The lower viscosity inks typically are used in gravure printing and the higher viscosity inks typically are used in flexographic printing. Thus, when the ink has a viscosity of about 28 seconds as measured in a #2 efflux cup, it is suitable for flexographic printing, and when the ink has a viscosity of about 18 seconds as measured in a #2 efflux cup, it is suitable for gravure printing.

The polyurethanes can be film forming upon removal of the solvent or water, or may be radiation curable. Unless formulated to be electron beam curable, the radiation curable compositions will frequently contain a photoinitiator. The inks include a colorant in addition to the binder and solvent. The colorant is one or more pigment or possibly a combination of pigment and one or more dyes. The colorant may be organic or inorganic. The most common pigments include azo dyes (for example, Solvent Yellow 14, Dispersed Yellow 23, and Metanil Yellow), anthraquinone dyes (for example, Solvent Red 1 11, Dispersed Violet 1, Solvent Blue 56, and Solvent Orange 3), xanthene dyes (Solvent Green 4, Acid Red 52, Basic Red 1, and Solvent Orange 63), azine dyes (for example, Jet Black), and the like. Major usable organic pigments include diarylide yellow AAOT (for example, Pigment Yellow 14 CI#21095), diarylide yellow AAOA (for example, Pigment Yellow 12 CI#21090), Phthalocyanine Blue (for example, Pigment Blue 15), lithol red (for example, Pigment Red 52:1 CI#15860:1), toluidine red (for example, Pigment Red 22 CI#12315), dioxazine violet (for example, Pigment Violet 23 CI#51319), phthalocyanine green (for example, Pigment Green 7 CI#74260), phthalocyanine blue (for example, Pigment Blue 15 CI#74160), naphthoic acid red (for example, Pigment Red 48:2 CI# 15865:2). Inorganic pigments include titanium dioxide (for example, Pigment White 6 CI#77891), carbon black (for example, Pigment Black 7 CI#77266), iron oxides (for example, red, yellow, and brown), ferric oxide black (for example, Pigment Black 11 CI#77499), chromium oxide (for example, green), ferric ammonium ferrocyanide (for example, blue), and the like. The colorant is not limited to the foregoing. Thus, the colorant may be any conventional organic or inorganic pigment such as Zinc Sulfide, Pigment White 6, Pigment Yellow 1, Pigment Yellow 3, Pigment Yellow 12, Pigment Yellow 13, Pigment Yellow 14, Pigment Yellow 17, Pigment Yellow 63, Pigment Yellow 65, Pigment Yellow 73, Pigment Yellow 74, Pigment Yellow 75, Pigment Yellow 83, Pigment Yellow 97, Pigment Yellow 98, Pigment Yellow 106, Pigment Yellow 114, Pigment Yellow 121, Pigment Yellow 126, Pigment Yellow 127, Pigment Yellow 136, Pigment Yellow 174, Pigment Yellow 176, Pigment Yellow 188, Pigment Orange 5, Pigment Orange 13, Pigment Orange 16, Pigment Orange 34, Pigment Red 2, Pigment Red 9, Pigment Red 14, Pigment Red 17, Pigment Red 22, Pigment Red 23, Pigment Red 37, Pigment Red 38, Pigment Red 41, Pigment Red 42, Pigment Red 57, Pigment Red 112, Pigment Red 122, Pigment Red 170, Pigment Red 210, Pigment Red 238, Pigment Blue 15, Pigment Blue 15:1, Pigment Blue 15:2, Pigment Blue 15:3, Pigment Blue 15:4, Pigment Green 7, Pigment Green 36, Pigment Violet 19, Pigment Violet 23, Pigment Black 7 and the like.

The lamination printing inks may also contain the usual ink additives to adjust flow, surface tension, and gloss of a printed ink. Such additives typically are polymeric dispersants, surface active agents, waxes, or a combination thereof. These additives may function as leveling agents, wetting agents, fillers, dispersants, defrothers or deaerators, or additional adjuvants may be added to provide a specific function. The lamination printing inks may contain a polymeric dispersant when the colorant is a pigment to disperse the pigment during mixing and grinding operations in the solvent. All components of the ink may be blended together and ground to reduce the pigment particles to the desired size distribution, typically 10 microns or less, or alternatively the pigment and the polymeric dispersant can be premixed and ground in the solvent to form a "base" which is subsequently blended with the remaining components of the ink composition. The ink components may be mixed in a high speed mixer until a slurry consistency is reached and then passed through a media mill until the pigment is reduced to 10 microns or smaller. The wide versatility of the inks of this invention allows them to be prepared without a polymeric dispersant, but preferably they are made with a polymeric dispersant for grinding in, for example, polyvinyl butyral or blending with, for instance, a nitrocellulose base. Thus, the ink of this invention may contain 0 to about 12 parts by weight of the polymeric dispersant. Other useful colorants, solvents and adjuvants can be identified by consulting The Printing Ink Manual.

The present invention further relates to the printed laminate obtained or obtainable by using the ink according to the invention for printing on at least a part of a surface of the laminate. The printed laminate is made preferably from at least two polymer films by laminating the films with a lamination adhesive wherein the ink resides between the laminated films. At least one of the polymer films on which surface the ink resides preferably comprises a material selected from polypropylene, polyethylene terephthalate, polyamide and low density polyethylene.

The present invention further relates to the method of making a printed laminate, which method comprises:

applying at least one lamination ink according to the invention to at least a part of a surface of a first polymer film by a roll printing process (such as gravure printing or flexographic printing) and laminating a printed or unprinted second polymer film to the ink-bearing surface of the first polymer film by use of an adhesive. The material of the first and/or the second polymer film is preferably selected from polypropylene, polyethylene terephthalate, polyamide and low density polyethylene.

Furthermore, the invention also relates to the use of polyurethane dispersions according to the invention for water based inks for laminating printed (primary) substrates to (secondary) flexible films. These laminates render high lamination bond strengths of preferably >1.5 N/15 mm and most preferably >2 N/15 mm before and after heat-seal.

Lamination is carried out by procedures well known to a person skilled in the art. Laminates in general are obtained for example by an ink according to the invention to the surface of a plastic substrate. After drying, a coated substrate is obtained. Subsequently a lamination adhesive is used to fix a second plastic surface to the coated substrate. The plastic substrates are preferably polymer films, especially transparent polymer films or wherein at least one polymer film is transparent.

Differently colored inks of the invention are especially suited for multiple printing, i.e. a first colored printed ink layer is covered with at least one further, white or non-white colored ink layer.

Benefits of the inks of the invention are high compatibility of the binder with the pigments; good blocking behavior of the printed film before lamination; high lamination bond strength of the film laminates, also in case of multiple printing; high re-solubility of ink which has temporarily dried on printing rolls; no volatile bases necessary.

The invention is now illustrated by the following non-limiting examples.

EXAMPLES

Test method for pigment compatibility:
A lamination coloured ink is prepared, upon blending 30 wt. % of a resin-based pigment concentrate with 70% of the polyurethane dispersion of the invention.

Typical formulation of a resin-based pigment concentrate:
40% organic pigment (eg PY13, PR57.1, PB15.3, PB7)/10% resin/1% surfactant/0.5% antifoam/48.5% water.

The viscosity of the ink is measured directly after preparation of the ink, after one day and after 7 days. Viscosity stability is reported. Ink is diluted to print viscosity (25 sec. DIN4 cup) and is printed on an OPP (oriented polypropylene) film. Visual appearance (color strength, gloss, transparency) is judged.

A lamination white ink is prepared, upon blending 40% of a resin-free pigment concentrate with 60% of the polyurethane dispersion according to the invention.

Typical formulation of a resin-free pigment concentrate white:
75% titanium dioxide/3% surfactant/0.5% antifoam/21.5% water.

Viscosity of the ink is measured direct after preparation of the ink, after one day and after 7 days. Viscosity stability is reported and pigment sedimentation is judged. Ink is diluted to print viscosity (25 sec. DIN4 cup) and is printed on an OPP film. Visual appearance (opacity, gloss) is judged.

Test method for viscosity measurement:
Prepare 120 g colour (or 150 g white) according to the test ink formulation, at an ink temperature of 20° C. Put the ink into an efflux cup (eg DIN4 cup) and register the time needed to run the cup empty (until the flow coming from the cup is no longer a continuous flow). Viscosity is recorded as "seconds DIN4".

Test method for re-solubility:
Ink will be diluted to press viscosity (25 sec. DIN4 cup) and will be printed in gravure on laboratory press on a substrate (eg LDPE).

Press will be stopped and impression roller will be lifted from the substrate. Press will be stopped for 5 minutes, in order to allow the ink to dry into the cells of the gravure cylinder. After 5 minutes press will be started again and the amount of cylinder rotations will be counted for the original image to recover on the printed substrate. The sooner the printed image will recover, the better the re-solubility (=ability to re-dissolve itself) of the ink is.

Typical ink preparation:
Coloured ink is prepared by blending 30 parts of a (resin-based or resin-free) pigment paste (e.g. PB15.3) and 70 parts of a binder test dispersion. The viscosity of the ink can be measured employing a DIN4 cup. The viscosity of the ink can be reduced to 20 s DIN4 using a 30/70 blend of pigment paste/water.

White ink is prepared by blending 40 parts of a resin-free pigment paste (e.g. PW6) and 60 parts of a binder test dispersion. The viscosity of the ink can be measured employing a DIN4 cup. The viscosity of the ink can be reduced to 20 s DIN4 using a 40/60 blend of pigment paste/water.

Typical Ink application:
Ink was applied on the treated side of coex-OPP (30MB400—Oriented Polypropylene Film which can be obtained from ExxonMobil Chemical) and on chemically treated polyester (Mylar® 813 which can be obtained from DuPont Teijin Films), using a wire-bar 0 (4 μm wet ink). Inks were applied as 100% colour (1 layer), 200% colour (2 layers) and 100% colour plus 100% white (2 layers). The resulting prints were dried in an oven for 60 s at 60° C. followed by a further drying period of about 1 hour at room temperature, before making a laminate.

Typical Lamination procedure:

In order to test the lamination bond strengths, the prints on coex-OPP and chemically treated polyester were laminated to coex-OPP and standard LDPE (Low-density Polyethylene) with a 2-component polyurethane lamination adhesive, respectively to give OPP//OPP and PET//LDPE laminates.

Preparation of the 2 component polyurethane lamination adhesive:

Liofol® Hardener UR6080: 8.0 weight parts (obtained from Henkel Industrial Adhesives)

Liofol® UR7780: 20.0 weight parts (obtained from Henkel Industrial Adhesives)

Ethyl acetate: 20.0 weight parts (solvent for ease of application)

Preparation of the laminate:

The freshly prepared adhesive is applied to the secondary (unprinted) film at a coating weight of 2.5 $g/m^2$ (dry), and subsequently dried in the oven for 10 s at 60° C. to evaporate the solvent. The printed films (coex-OPP and chemically treated PET) are next carefully applied with the printed side to the adhesive side of the secondary films (coex-OPP and LDPE, respectively), thereby avoiding creation of air bubbles in the laminate, to give OPP//OPP and PET//LDPE laminate structures. The resulting laminates are stored for 3 days under pressure (ca 0.25 $kg/cm^2$), in order to allow the adhesive to cure.

Example 1

Polyurethane Dispersion

TABLE 1

| | polyurethane dispersion components | | | | |
|---|---|---|---|---|---|
| | Component | Equiv. MW | Amount (g) | weight % (solid PUD) | Equivalent (OH, NCO, NH) |
| Pre-charge | polyester based on adipic acid, neopentylglycol, 1,6-hexanediol; OH number = 56 mg KOH/g | 1020 | 205.2 | 32.1 | 0.201 |
| | pTHF2000 | 1000 | 201.2 | 31.5 | 0.201 |
| | n-butanol started polyethylene glycol (monohydric alcohol); OH number = 26 mg KOH/g | 2158 | 46.55 | 7.3 | 0.0216 |
| | Bismuth neodecanoate cat. (CAS = 34364-26-6) | | 0.30 | 0.05 | / |
| Feed 1 | Isophorone diisocyanates (IPDI) | 111.1 | 66.60 | 10.4 | 0.599 |
| | $H_{12}$ MDI (Desmodur® W) | 132.1 | 79.13 | 12.4 | 0.599 |
| Feed 2 | Acetone | | 109.0 | | |
| Feed 3 | 1,4-butanediol | 45.05 | 21.34 | 3.34 | 0.474 |
| Feed 4 | Acetone | | 468.1 | | |
| Feed 5 | 40% solution in $H_2O$ of sodium N-(2-aminoethyl)-beta-alaninate | 208.6 | 30.00 | 1.88 | 0.144 |
| Feed 6 | Water | | 730.1 | | |
| Feed 7 | isophoronediamine (IPDA) | 84.37 | 2.02 | 0.32 | 0.0239 |
| | Diethylenetriamine | 34.53 | 4.14 | 0.65 | 0.120 |
| | Water | | 36.32 | | | pTHF2000: poly(tetrahydrofuran) with molecular weight about 2000 (1950-2050)

The components of the pre-charge are charged in a reactor vessel followed by the mixture of isocyanates (Feed 1). Acetone (Feed 2) is added to the mixture and the mixture is heated to reflux until the theoretical NCO value is reached. 1,4-butanediol (Feed 3) is added and the reaction is further stirred at reflux until the desired NCO value is reached. The mixture is diluted with acetone (Feed 4). At an internal temperature of 50° C., Feed 5 is added. The mixture is dispersed by addition of water (Feed 6), followed by addition of the amines mixture and water (Feed 7). Acetone is distilled under vaccum.

Product Characteristics:

Solid content: 45% pH: 9.5

Viscosity: ca. 130 mPa·s (25° C.)

Example 2

Printing Ink and Printing and Laminating Application

Coloured Ink:

| | |
|---|---|
| Joncryl® HPD96 Pigment Concentrate PB15.3 | 30 wt % |
| Polyurethane dispersion (example 1) | 70 wt % |

White ink:

| | |
|---|---|
| T750W Pigment concentrate PW6 | 40 wt % |
| Polyurethane dispersion (example 1) | 60 wt % |

Ink viscosity is measured, using DIN4 cup, directly after the ink has been prepared. Same ink is measured for viscosity after 1 day and after 7 days, as a measure of ink stability. The results are given in table 2.

TABLE 2

| | Viscosity (seconds DIN4 cup) | | |
|---|---|---|---|
| | Viscosity direct | Viscosity after 1 day | Viscosity after 7 days |
| Colour | 35 sec | 37 sec | 37 sec |
| White | 21 sec | 22 sec | 22 sec |

Before being able to print the ink on a substrate, the ink has to be diluted to press viscosity.

Reduce viscosity to 20 sec DIN4, using a blend of 30% HPD96 PB15.3/70% water for colour ink Reduce viscosity to 20 sec DIN4, using a blend of 40% T750W PW6/60% water for white ink

TABLE 3

Typical example of dilution to print viscosity:

|  | Viscosity direct | Dilution (ink:water) | Print viscosity |
|---|---|---|---|
| Colour | 37 sec | 100:5 | 20 sec |
| White | 22 sec | 100:2 | 20 sec |

Ink application:

Print the ink on coextruded OPP (MB400, ex ExxonMobil) and on polyester film (Mylar 813, ex Teijin-DuPont), using a K-bar 0 (applying 4 micron wet coating weight).

For two layers (colour+white): print the first layer of colour and dry the print in the oven, then print the second layer of white ink on top of the first layer and dry the print again in the oven.

Drying:

For one-layer print: put the printed substrate in an air circulated oven, for 10 sec at 60° C. air temperature, then leave the print for 1 h at room temperature before laminating it to the secondary film.

For two-layers print: print the first colour layer, dry 10 sec at 60° C. in an air circulated oven, print the second layer of white ink, dry 10 sec at 60° C. and leave the print for 1 h at room temperature, before laminating it to the secondary film.

Lamination:

Laminate the printed film (OPP resp. PET) to a secondary film (OPP resp. LDPE), using a 2 component laminating adhesive, in order to get an OPP//OPP resp. PET/LDPE laminate:

Prepare lamination adhesive: blend 4 g Henkel Liofol® UR6080/10 g Henkel Liofol® UR7780/10 g ethyl acetate and mix homogeneous Apply lamination adhesive onto the secondary film, using K-bar 1 (6 micron wet coating weight), followed by subsequent drying (10 sec in oven at 60° C.)

Apply the printed film onto the secondary film, with the printed side facing the adhesive Firmly squeeze the laminated construction, by using a 10 kg roller Put the laminate under pressure (10 kg blocks) and store for 3 days at room temperature Lamination Bondstrength:

For measurement of lamination bond strength (=force needed to peel the laminate open), a strip of 15 mm width is cut from the cured laminate and bond strength is measured using a Lloyd Instruments tensile tester. Measurement is done at a speed of 150 mm/min. During the measurement, the laminated strip should be kept under a 90° angle against the film clamps. This test is repeated after the laminated strip has been heat-sealed at 140° C/400N/1 s using a Brugger heat sealer, in order to simulate heat-seal bond strength. Lamination bond strength is reported in N/15 mm.

TABLE 4

Typical example of lamination bond strength measurement result

| Ink | Substrate | Lamination bond strength [N/15 mm] |
|---|---|---|
| 100% coloured ink ex. 2 | OPP//OPP | 4.0 |
| 100% white ink ex 2 | OPP//OPP | 4.5 |
| 100% coloured ink ex. 2 + 100% white ink ex 2 | OPP//OPP | 4.8 |
| 100% coloured ink ex. 2 | PET//LDPE | 2.5 |
| 100% white ink ex 2 | PET//LDPE | 2.5 |
| 100% coloured ink ex. 2 + 100% white ink ex 2 | PET//LDPE | 2.5 |

Blocking resistance:

Diluted ink (diluted to a viscosity of 20 sec. DIN4 cup) will be printed on the relevant substrate (eg LDPE, OPP, PET, Nylon). Coating weight applied: 1.0 g/m$^2$ for colour and 1.5 g/m$^2$ for white. Print will be dried in an oven: 10 sec. at 60° C. After drying, a second layer film (same specification) will be placed on top of the printed film, with the backside of the second film facing the printed side of the printed film. Films will be placed in a Specac laboratory press and will be blocked at 5 tons/30° C./24 hrs (representing 65 kg/cm$^2$). After removing the samples from the blocking tester, the unprinted layer film will be removed from the printed layer, and the tendency of the unprinted film to adhere to the printed film ("blocking") will be judged and reported as "Release" (tackiness) and "Damage" (ink transfer to the unprinted film). Typical example of blocking resistance measurement results are reported below. The values go from 1 (bad, blocking ink) to 5 (good, blocking-free ink).

TABLE 5 blocking resistance measurement results

| Ink | Substrate | Release | Damage |
|---|---|---|---|
| 100% coloured ink ex. 2 | PET//LDPE | 4 | 5 |
| 100% white ink ex 2 | PET//LDPE | 3-4 | 5 |
| 100% coloured ink ex. 2 + 100% white ink ex 2 | PET//LDPE | 3-4 | 5 |

The invention claimed is:

1. A lamination printing ink comprising:
   at least one binder,
   at least one pigment,
   an aqueous carrier, wherein the aqueous carrier is a solvent or water, and
   optionally, at least one additive,
   wherein the at least one binder is an aqueous dispersion comprising a polyurethane,
   wherein the polyurethane is made of components comprising:
   a) at least one polyisocyanate with at least two isocyanate groups,
   b) a combination of diols, wherein
      b1) at least one of the diols is a polyesterdiol having a number average molecular weight of from 500 to 5,000, and
      b2) at least one of the diols is polytetrahydrofuran having a number average molecular weight of from 500 to 5,000 g/mol,
   c) at least one monohydroxy-poly(alkylene oxide) compound having a number average molecular weight of from 500 to 5,000 g/mol, d) at least one diamino acid compound,
e) at least one polyamine compound having at least two amino groups and no acid group, and
f) optionally, one or more polyol compounds having a number average molecular weight of less than 500 g/mol,
wherein the lamination printing ink is a gravure ink or a flexographic ink comprising from 8 to 60 wt. % of the at least one binder, from 3to 30 wt. % of the at least one pigment, and from 15 to 60 wt. % of the aqueous carrier, and
wherein the ink has a viscosity suitable for flexographic printing or for gravure printing, wherein the viscosity is from 15 seconds to 30 seconds, as measured in a No. 2 efflux cup.

2. The lamination printing ink according to claim 1, wherein the polyisocyanate (a) is at least one selected from the group consisting of 1-isocyanato-3,5,5-trimethyl-5-isocyanatomethylcyclo-hexane (IPDI), tetramethylxylylene diisocyanate (TMXDI), hexamethylene diisocyanate (HDI), bis(4-isocyanatocyclohexyl)methane (HMDI) and a mixture thereof.

3. The lamination printing ink according to claim 1, wherein the polyesterdiol is made from
at least one dicarboxylic acid of the formula HOOC—$(CH_2)_y$—COOH, where y is a number from 1 to 20, and
at least one polyhydric alcohol selected from the group consisting of a compound of the formula HO—$(CH_2)_x$—OH, where x is a number from 1 to 20, neopentyl glycol, and a mixture thereof.

4. The lamination printing ink according to claim 1, wherein the alkylene in the at least one monohydroxy-poly(alkylene oxide) compound is ethylene and/or propylene.

5. The lamination printing ink according to claim 1, wherein the at least one diamino acid compound is selected from the group consisting of a diamino carboxylic acid compound and a diamino sulfonic acid compound, corresponding alkali metal salts thereof, and a mixture thereof.

6. The lamination printing ink according to claim 1, wherein the at least one polyamine compound is selected from the group consisting of isophoronediamine, diethylenetriamine and a mixture thereof.

7. The lamination printing ink according to claim 1, wherein the polyurethane is made of components comprising:
a) 5 to 30% by weight of the at least one polyisocyanate with at least two isocyanate groups,
b) 10 to 80% by weight of the combination of diols,
c) 1 to 20% by weight of the at least one monohydroxy-poly(alkylene oxide) compound having a number average molecular weight of from 500 to 5,000 g/mol,
d) 1 to 10% by weight of the at least one diamino acid compound,
e) 0.1 to 10% by weight at least one polyamine compound having at least two amino groups and no acid group, and
f) optionally, 0 to 10% by weight of one or more polyol compounds having a number average molecular weight of less than 500 g/mol.

8. The lamination printing ink according to claim 1, wherein the ink is free of ammonia and free of volatile organic tertiary amines.

9. The lamination printing ink according to claim 1, further comprising from 0.1 to 5% by weight of the at least one additive, wherein the at least one additive is a surfactant, antifoam agent, a wax, other additive, or a combination thereof.

10. The lamination printing ink according to claim 1, wherein the at least one polyisocyanate (a) comprises only an aliphatic diisocyanate, and/or a cycloaliphatic diisocyanate; and the at least one of the diols (b1) comprises only at least one olyesterdio synthesized from an aliphatic diol and a diacid; and the at least one diamino acid component (d) comprises an alkali metal salt of N-(2-aminoethyl)-2-aminoethane sulfonic acid and/or N-(2-aminoethyl)-2-amino-ethane carboxylic acid; and the at least one diamino acid component (e) is a mixture of diethylenetriamine and isophoronediamine (DETA/IPDA).

11. A printed laminate having the ink of claim 1 on at least a part of a surface thereof.

12. The printed laminate of claim 11, wherein the laminate is made from at least two polymer films by laminating the films with a lamination adhesive, wherein the ink resides between the laminated films.

13. The printed laminate of claim 11, wherein at least one of the polymer films on which surface the ink resides comprises at least one material selected from the group consisting of polypropylene, polyethylene terephthalate, polyamide and low density polyethylene.

14. A method of making a printed laminate, which comprises:
applying at least one lamination ink of claim 1 to at least a part of a surface of a first polymer film by a roll printing process, and
laminating a printed or unprinted second polymer film to the ink-bearing surface of the first polymer film by use of an adhesive.

15. The method of claim 14 wherein the material of the first and/or the second polymer film is selected from the group consisting of polypropylene, polyethylene terephthalate, polyamide, low density polyethylene, and mixtures thereof.

16. The lamination printing ink according to claim 1, wherein the at least one of the diols b2) is polytetrahydrofuran having a number average molecular weight of from 1,000 to 3,000 g/mol.

17. The lamination printing ink according to claim 1 that comprises (f) one or more polyol compounds having a number average molecular weight of less than 500 g/mol.

18. The lamination printing ink according to claim 5, wherein the at least one diamino acid compound d) is selected from the group consisting of N-(2-aminoethyl)-2-aminoethane-sulfonic acid, N-(2-aminoethyl)-2-aminoethanecarboxylic acid, a corresponding alkali metal salt, and a mixture thereof.

19. The lamination printing ink according to claim 7, wherein a weight ratio of the polyesterdiol in b1) and the polytetrahydrofuran diol in b2) is from 1:2 to 2:1.

20. The method of making a printed laminate according to claim 14, which comprises applying the at least one lamination ink to at least a part of a surface of the first polymer film by gravure printing or by flexographic printing.

* * * * *

UNITED STATES PATENT AND TRADEMARK OFFICE
CERTIFICATE OF CORRECTION

PATENT NO. : 10,280,320 B2  
APPLICATION NO. : 15/110246  
DATED : May 7, 2019  
INVENTOR(S) : Paola Romanato et al.

Page 1 of 1

It is certified that error appears in the above-identified patent and that said Letters Patent is hereby corrected as shown below:

In the Specification

Column 3, Line 22, "from1:3" should read -- from 1:3 --.

Column 5, Lines 15-16, "4,4'-diaminodicyclo-hexylmethane," should read -- 4,4'-diaminodicyclohexylmethane, --.

Column 8, Line 11, "Red 1 11," should read -- Red 111, --; and
    Lines 24-25, "CI# 15865:2)." should read -- CI#15865:2). --.

Column 10, Line 8, "(eg" should read -- (e.g. --;
    Line 29, "(eg" should read -- (e.g. --; and
    Line 36, "(eg" should read -- (e.g. --.

Column 14, Line 17, "(eg" should read -- (e.g. --.

In the Claims

Column 15, Line 9, Claim 1, "3to" should read -- 3 to --; and
    Lines 18-19, Claim 2, "isocyanatomethylcyclo-hexane" should read
    -- isocyanatomethylcyclohexane --.

Column 16, Line 9, Claim 10, "olyesterdio" should read -- olyesterdiol --.

Signed and Sealed this  
Twenty-eighth Day of January, 2020

Andrei Iancu  
*Director of the United States Patent and Trademark Office*